Patented June 29, 1926.

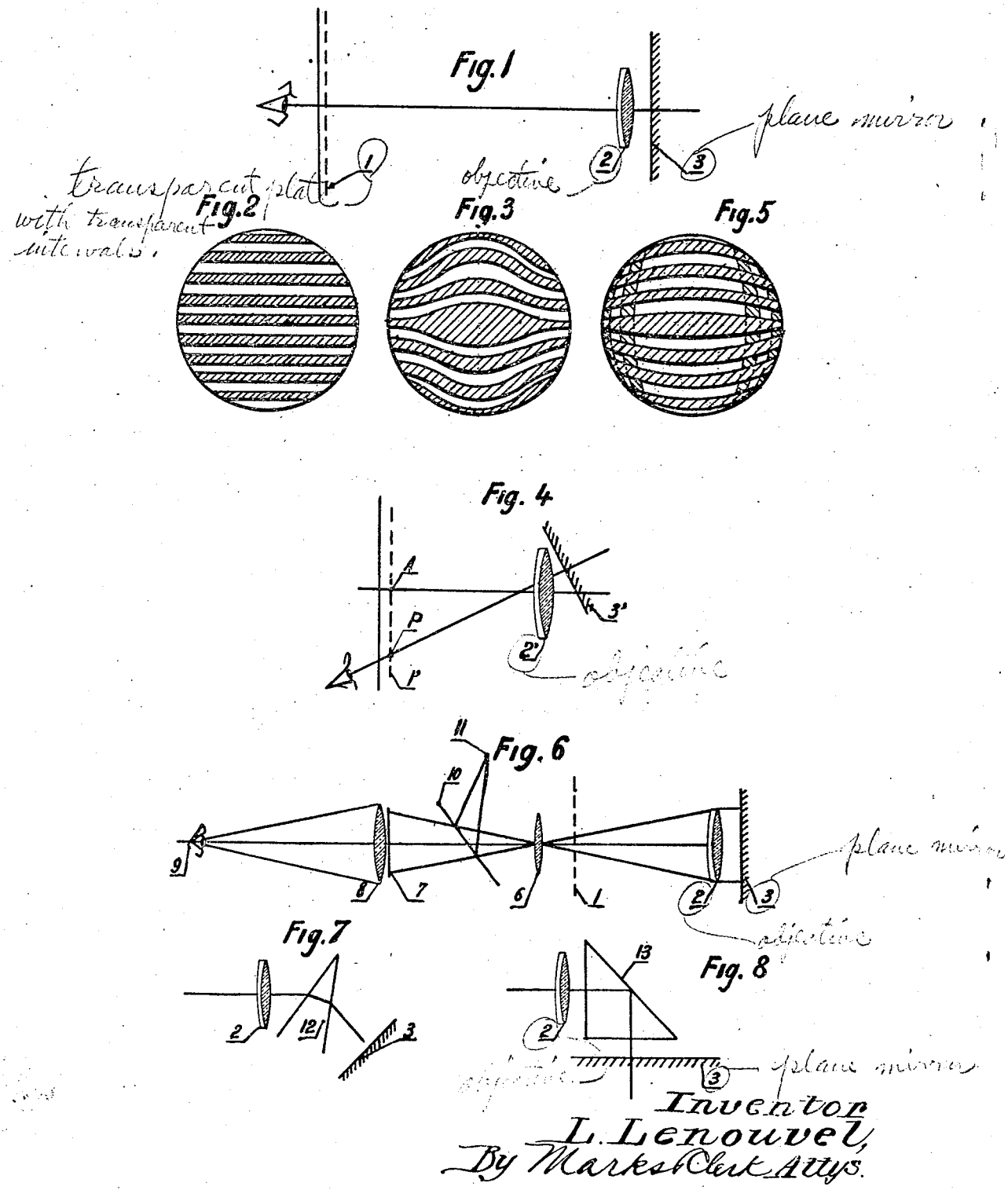

1,590,532

UNITED STATES PATENT OFFICE.

LEON LENOUVEL, OF BIHOREL-ROUEN, FRANCE.

METHOD AND ARRANGEMENT FOR THE EXAMINATION AND THE REGULATION OF OPTICAL SYSTEMS.

Application filed May 28, 1923, Serial No. 642,058, and in France July 4, 1922.

My invention relates to a method and arrangement for effecting or verifying the regulation of optical systems producing a real image of objects at an infinite distance, for instance in the case of objectives of photographic apparatus or telescopes or like devices, as well as for observing these optical systems so as to ascertain the aberrations, to measure the same, and to locate the position of the corresponding regions of the optical system.

The principle of the method, which is related to the known methods of auto-collimation, consists in examining the optical system through a ruled screen against which the eye is placed, the said screen being situated adjacent the supposed focal plane of the system and whereof the real image, after being reflected and again traversing the system, is formed adjacent the focal plane of the system. The appearance of the system thus observed will give data concerning the adjustment of the apparatus and the aberrations of the system, since the coincidence of the plane of the image of the screen and the plane of the actual screen will correspond to an appearance of uniform lighting of the system whilst the lack of coincidence of these planes will give a streaked appearance.

The apparatus embodying the said method is constituted in its simplest form by a ruled screen or grating disposed at the rear of the system and in the focal plane, and by a plane mirror situated at the front of the system, the arrangement being completed by a set of lenses and mirrors of simple construction, facilitating the observation of the system through the said screen without making it necessary to place the eye exactly upon the screen, whilst the latter may be suitably illuminated.

The following description and the appended drawing which are given by way of example set forth the said invention.

Fig. 1 is a diagrammatic view of the arrangement for the application of the method to the regulation or the observation of the objective.

Fig. 2 shews the appearance of the perfect objective in the case in which the regulation is defective.

Fig. 3 shews the appearance of an objective having spherical aberration.

Fig. 4 is a diagrammatic view shewing the use of the said method for determining the curvature of the field.

Fig. 5 shews the appearance of an objective having astigmatism combined with a remainder of spherical aberration.

Fig. 6 shews an arrangement comprising a set of lenses in which it is not necessary to place the eye to the screen, as well as a polished glass plate for the illumination of the said screen.

Figs. 7 and 8 shew the use of the method and arrangement for the examination of an ordinary prism and a total reflection prism.

A striated plate having opaque lines with transparent intervals 1, resembling the gratings or screens employed in photogravure, is disposed in the focal plane of the objective 2 which is supposed to be perfect. In front of the said objective is disposed a plane mirror 3 in a suitable direction. The screen is uniformly illuminated by monochromatic light, so that the light traversing it will be equally distributed over the surface of the objective thus producing in the system 2, 3, 2 a real image which if the screen is exactly in the focal plane will be located in the plane of the screen, since the respective position of the actual lines of the screen and the lines of the image of the said screen will depend upon the direction of the mirror, these lines being however always parallel.

One places the eye close to the screen and observes the objective. If the screen and its image are quite in the same plane, i. e. if the adjustment is exact, the eye will see the surface of the objective which is uniformly lighted. This lighting is a maximum when the lines of the image of the screen coincide exactly with the actual lines of the screen, and is a minimum when the image of a line coincides with a space between the lines. But should the adjustment be imperfect, the image of the screen is not formed in the plane of the actual screen but forwardly or rearwardly of this plane. In these conditions, the eye will see the objective covered with streaks which are parallel with the lines of the screen, and the spacing of the streaks will decrease as the adjustment of the system is more exact. The whole effect will be substantially the same as if the eye observed the objective through a system of two actual screens which are suitably spaced apart, and in this case the objective will appear as in Fig. 2.

Should the objective possess spherical aberration, the various parts of the lens will produce images of the screen which are not in the same plane. In Fig. 3 it is supposed that the coincidence of the image with the screen has been obtained for the central rays, and hence a uniformly lighted region is observed at the centre of the objective; but on the contrary, since the rays from the edge of the objective will produce images of the actual screen which are displaced with reference to the image produced by the central rays, this will lead to the production around the uniformly lighted region of streaks which are closer together as the aberration increases more rapidly. The spacing of the streaks or lines upon the lens will obviously depend upon the spacing of the lines of the screen. Taking for instance two points on the objective which coincide with the centre of two adjacent lines, the transverse aberration in the corresponding direction for the focus at infinity will vary by 1-20th of a millimetre for a screen having ten lines per millimetre. These streaks are no longer parallel, since the arrangement will only give evidence of the component of the aberration in a direction perpendicular to the screen.

The curvature of the field can be observed with the said arrangement, Fig. 4, and to this end one displaces the eye from the optical axis of the arrangement, parallel with the plane of the screen and perpendicular to the direction of the lines. For each position of the eye, the mirror 3′ is more or less inclined so that the image of the point P on the screen shall be formed approximately at P. The adjustment which was previously made for the point A upon the optical axis, should hold good for the point P. If a displacement by a movement parallel with the secondary optical axis should be necessary in order to provide for the uniform illumination of the objective, this displacement will afford a measurement of the curvature of the field at P. This displacement is produced by suitable means, not shown. A non-symmetrical appearance of the curvature of the field could only result from a defective construction of the apparatus (optical axis of the objective which is not perpendicular to the plate).

For the determination of astigmatism, it is advisable to use a screen which is ruled in squares, the direction of any two lines crossing at right angles being that of the focal lines. In this manner one may make the adjustment according to a given focal line, by causing the streaks having the corresponding direction to disappear from the objective. For more complicated cases of aberration, the streaks having a given direction cannot be made to disappear simultaneously throughout the whole extent of the field. Fig. 5 shews the appearance of the objective in the case of astigmatism combined with a certain residual spherical aberration.

In all the preceding considerations, the eye is supposed to be placed close to the screen plate 1, the latter being uniformly illuminated. In order to obtain this result with facility, the arrangement shewn in Figs. 1 and 4 is completed as observed in Fig. 6. A lens 6 produces a real image of the objective 2 at 7. This real image 7 is observed by means of a viewing lens of suitable focal distance 8; the eye is situated at the point 9 occupying the proper position relative to the portion of the screen used in the system 6—8. A polished glass plate 10 at a 45 degree angle will readily provide for the illumination by means of a source of light 11 situated at one side.

With the arrangement thus completed, the chromatic aberrations can be observed with great facility. It is simply necessary to dispose for example a spectroscope of the direct observation type between the eye 9 and the real image 7 of the objective. The slit of the spectroscope is disposed close to the image 7 and the whole surface of the objective can thus be passed over by successive portions. The appearance of the spectrum obtained by illuminating the apparatus by white light will give indications concerning the chromatic aberrations.

Should the said apparatus be used with an objective of perfect quality or one whose aberrations are known, this will enable the observation of all desired systems, and chiefly of plates, mirrors and prisms. Fig. 7 relates to observations of an ordinary prism 12, and Fig. 8 to observations of a total reflection prism 13.

It is feasible to make use of very close gratings or ruled screens which have for instance one-hundred or even three-hundred lines per millimetre, and in this case the fringes observed are due to interference between the waves which are subject to transmission and diffraction by the screen. Observation of the fringes will afford data upon the general form of the wave surface corresponding to the rays proceeding from a point at infinite distance after being refracted through the system.

What I claim is:

1. A method for examining and regulating optical systems producing a real image of objects placed at an infinite distance, which comprises placing a ruled screen substantially in focal plane of said system, returning by reflection on a plane mirror image of said screen produced by the system and examining optical system through screen and image thereof formed substantially on screen itself.

2. A method for examining and regulating optical systems producing a real image of objects placed at an infinite distance, which comprises placing a ruled screen substantially in focal plane of said system, returning by reflection on a plane mirror image of said screen produced by the system and examining optical system through various parts of screen and of image thereof, inclining mirror in accordance with direction of examination and moving optical system until image of part of screen examined is formed substantially on screen itself.

3. An arrangement for the examination and regulation of optical systems comprising a ruled screen substantially in the front focal plane of the optical system to be examined, and a plane mirror on the further side of the system.

4. An arrangement for the examination and regulation of optical systems comprising a ruled screen substantially in the front focal plane of the optical system to be examined, a plane mirror on the further side of the system, an optical device close in front of screen producing a real image of optical system and means for examining said image.

5. An arrangement for the examination and regulation of optical systems comprising a ruled screen substantially in the front focal plane of the optical system to be examined and movable with reference to same, a pivotally plane mirror on the further side of said system, an optical device close in front of the screen producing a real image of the optical system, a lateral illuminant and a polished glass placed at 45° to axis of arrangement in front of said optical device.

In witness whereof I have hereunto set my hand.

LEON LENOUVEL.